INVENTORS
EDWIN C. UHLIG
LINWOOD A. MURRAY, Jr.
BY
Charles B. Willson
ATTORNEY

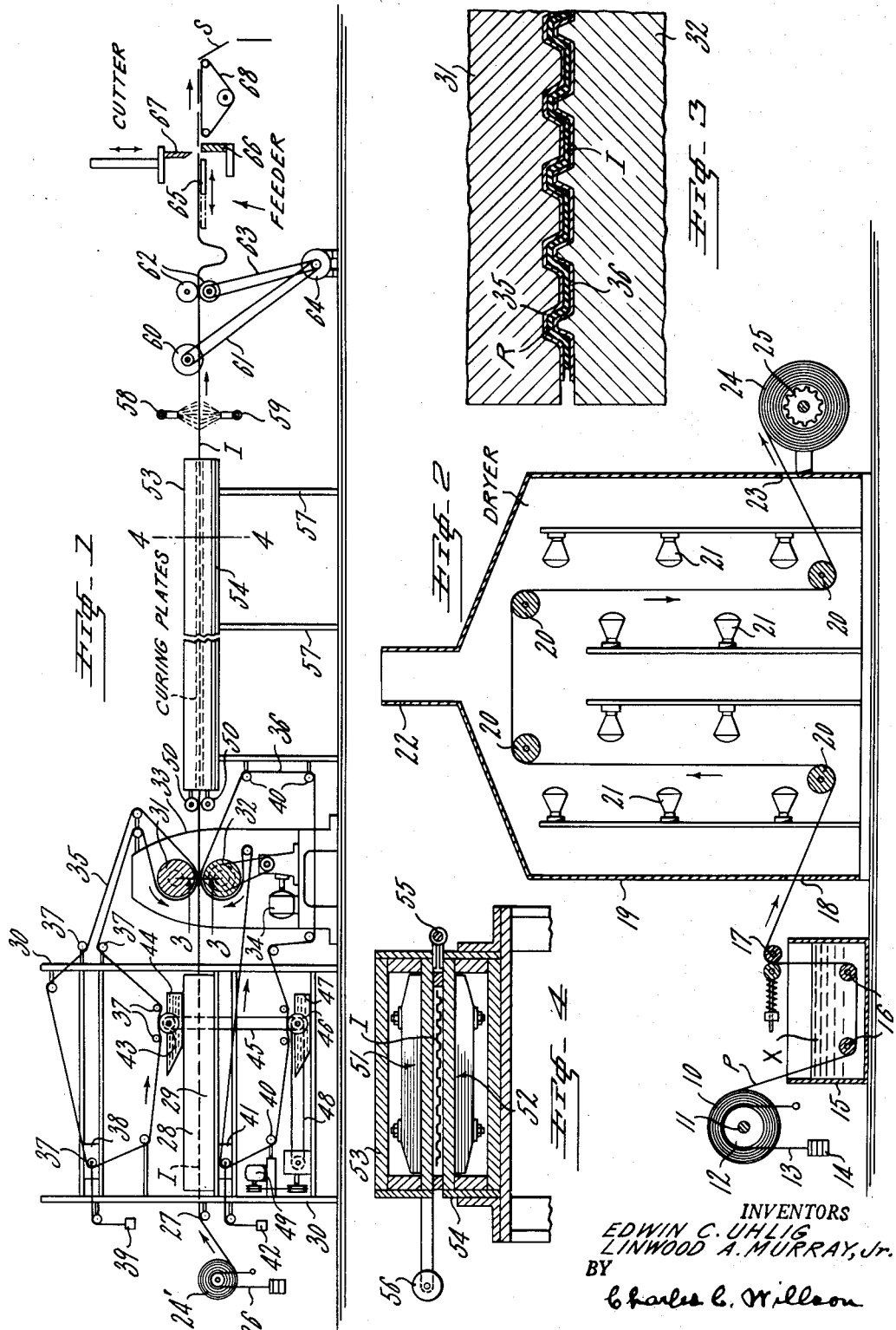

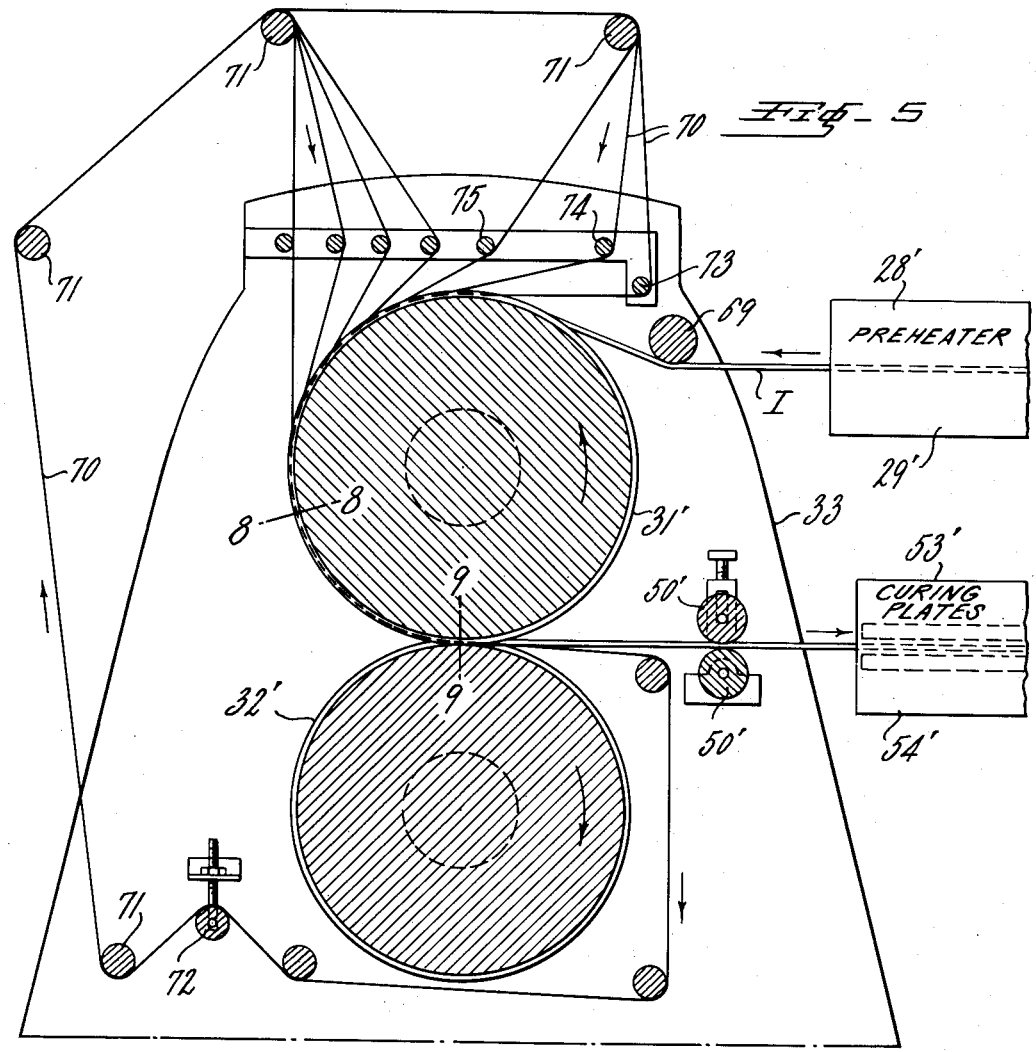
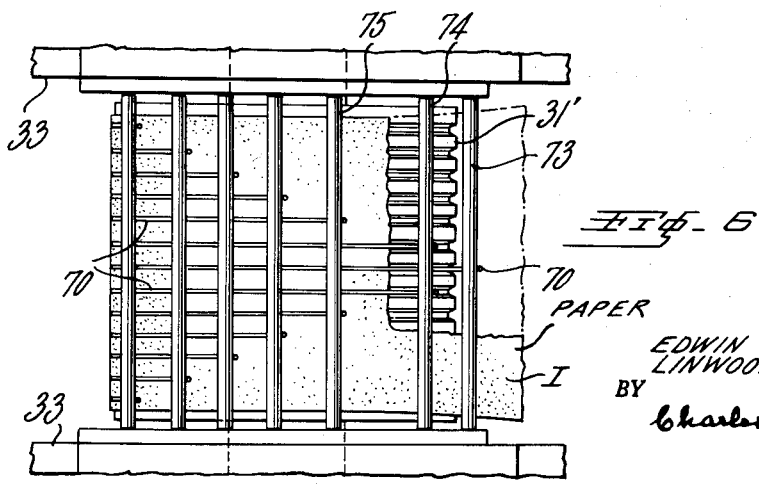

United States Patent Office 2,717,423
Patented Sept. 13, 1955

2,717,423

METHOD OF MAKING EMBOSSED BATTERY SEPARATORS

Edwin C. Uhlig, Greenwood, and Linwood A. Murray, Jr., Cranston, R. I., assignors to United States Rubber Company, New York, N. Y., a corporation of New Jersey Application January 4, 1952, Serial No. 265,036

8 Claims. (Cl. 18—47.5)

This invention relates to a method of making embossed battery separators of cellulose fibrous sheet material which has been impregnated with a thermosetting resin, and of heat curing the embossed sheet to set the impregnating resin.

Most of the electric storage batteries manufactured today for the automobile industry are provided with wood separators, cut from wood so as to provide ribs upon one face thereof, and used to separate the lead plates in the battery. Wood separators are used because they are less expensive than the other suitable materials, such as microporous hard rubber separators, matted glass fiber separators etc., but wood separators have a processing disadvantage in that the wood must be wet treated and the separators must be handled and maintained in the wet condition until submerged in the electrolyte of the battery in which they are used. This is necessary to keep the thin wood board forming the separator from cracking.

Wood separators have another disadvantage in that they cannot be used in the dry-charged type of battery, since they must be maintained in the wet condition. The above mentioned microporous hard rubber separators are suitable for dry-charged storage batteries and have many advantages over the wood separators, but they are too expensive to compete for the market serviced by the wood separators.

The present invention contemplates an inexpensive battery separator formed from a bibulous cellulose fibrous sheet such as wood pulp or cotton linter and which is impregnated with a carefully selected thermosetting resin, which when cured, will protect the cellulose fibers from the action of the battery electrolyte and will also increase the strength of the sheet, help to hold the fibers in place and impart to the separator sufficient stiffness to cause it to retain the desired rib formation after the sheet has been embossed and cured.

The battery separator contemplated by the present invention can be manufactured at a sufficiently low cost to compete in price with the above mentioned wood battery separator, and it possesses an important advantage over the wood separator in that it does not need to be kept wet prior to its introduction into a battery and immersed in the electrolyte of the battery.

The manufacture of an embossed, resin treated battery separator formed of a sheet of cellulose fibrous material, as herein contemplated, presents a number of problems. One of these problems is due to the fact that a fibrous sheet such as a sheet formed of wood pulp or cotton linter tends to distintegrate when soaked in battery acid, and therefore it must be impregnated with a sufficient amount of resin to strengthen the sheet and protect the fibers from the battery acid. On the other hand a battery separator must be sufficiently porous to permit the electrolyte to pass fairly freely therethrough. Therefore, another requirement of the resin used to impregnate the sheet to strengthen and protect the same is that it shall not unduly reduce the porosity of the fibrous sheet.

Still another problem encountered in developing the method of the present invention arose in embossing the fibrous sheet to provide the same with the desired embossed ribs. In order to produce such an embossed separator it is important that the embossing operation be performed at high speed so as to keep the cost down, but it is found that if the fibrous sheet is rapidly embossed it will tend to crack along the embossed or distended ribs. These cracks are caused when the essentially non-elastic fibrous sheet is quickly stretched as it is passed between rapidly turning embossing rolls.

We have found that one way to prevent such cracking of the fibrous sheet when it is being embossed at high speed is to cover each face with a liner of sheet material so that the pressure of the embossing rolls will be exerted upon the liner sheets, which engage and protect the fibrous sheet as it is embossed. These liner sheets act to distribute the strain exerted upon the fibrous sheet and to mechanically support such sheet during the embossing operation. It is found that the use of such liner sheets make it possible to emboss the fibrous sheet at high speed without producing cracks along the embossed ribs.

Another method for relieving the fibrous sheet from serious strains during the embossing operation is to press the advancing fibrous sheet at successively advanced points into the grooves of an embossing roll, to thereby initiate the formation of embossed ribs, and then complete the embossing operation by passing the sheet between embossing rolls. The fibrous sheet is preferably embossed while it is in a slightly damp and limp condition.

As soon as the fibrous sheet has been embossed and while it retains most of the embossed design it should be heat treated to cure the thermosetting resin with which the sheet was impregnated before the embossing operation, so as to set the resin and increase the stiffness of the embossed sheet.

Having in mind the foregoing, the primary objects of the method of the present invention are to provide an inexpensive embossed battery separator formed of a bibulous cellular fibrous sheet that is so impregnated with a thermosetting resin that the resin renders the separators sufficiently strong and durable to give good service in the battery, while such resin does not render the separator impervious to the electrolyte of the battery; and to produce such separator at a sufficiently low cost to enable it to be sold in competition with the wood battery separators which are now in extensive use in the batteries used by the automobile industry.

The above and other features of the method of the present invention will be further understood from the following description when read in connection with the accompanying drawings showing apparatus for carrying out the method.

In the drawings:

Fig. 1 is a more or less schematic view of apparatus for embossing, heat curing, and cutting an advancing sheet into separators, the view being in side elevation with parts in section;

Fig. 2 on a larger scale is a vertical sectional view through apparatus for impregnating, and drying the fiber sheet preparatory to embossing the same;

Fig. 3 is an enlarged sectional view of the embossing rolls taken on the line 3—3 of Fig. 1;

Fig. 4 is a transverse sectional view through the heat curing apparatus, the view being taken on the line 4—4 of Fig. 1;

Fig. 5 is a vertical sectional view through a modified form of embossing apparatus for embossing the advancing sheet;

Fig. 6 is a top plan view of the apparatus shown in Fig. 5;

Figure 7:
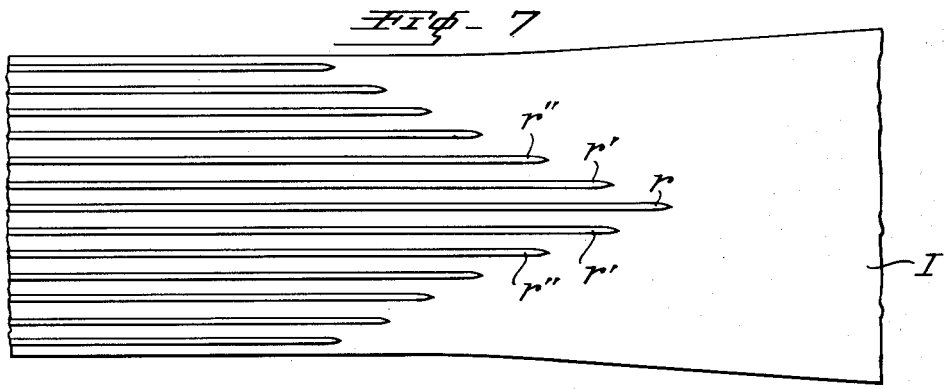
Fig. 7 is a top plan view of a fibrous sheet showing how the sheet is progressively initially embossed by the apparatus of Fig. 5 before it is acted upon by the embossing rolls.
Figure 8:
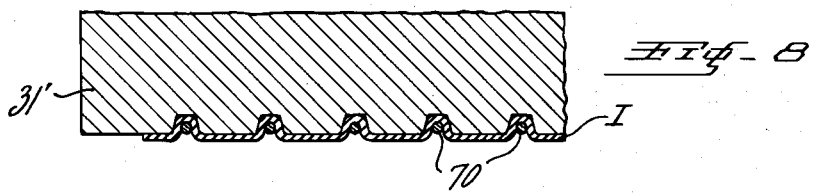
Fig. 8 is an enlarged sectional view taken on the line 8—8 of Fig. 5.

The nature of the fibrous sheet used in carrying out the present invention is important if good battery separators are to be produced. What is required is a bibulous cellulose fibrous sheet formed of cotton linter, or wood pulp which has been freed of most of the natural resins to provide a fibrous sheet containing at least 85 percent alpha cellulose. This fibrous sheet should be uniform as to thickness and as to fiber distribution; that is it should have what is called uniform "formation." The sheet may have a gauge of about .03" and should be porous so that the resin with which the sheet is to be impregnated can penetrate deep into the sheet to protect and unite the fibers.

The type of binding agent used to impregnate the fibrous sheet is also important. The preferred binding agent is a thermosetting phenol-formaldehyde resin that is preferably employed in the form of a solution of the A-stage resin in an aqueous medium such as water or aqueous acetone or aqueous lower aliphatic alcohol, e. g., methanol, ethanol or isopropanol. However, other thermosetting resins which are acid-resistant such as phenol-furfural resins, melamine-formaldehyde resins, etc., may be used in the form of a solution or suspension and as above stated the resin should be so introduced into the fibrous sheet that it will stiffen the sheet when cured and protect the fibers, without unduly decreasing the porosity of the fibrous sheet. This resin solution should be sufficiently thin to penetrate the entire sheet and become deposited around the fibers.

Now referring to Sheet 1 of the drawings, the bibulous cellulose fibrous sheet which is to be impregnated with a resin, such as above described, is preferably provided in the form of the roll of porous paper stock such as designated by P in Fig. 2 of the drawing, and the width of this long strip of paper is preferably slightly greater than that of the finished separator, so that a small amount of stock can be trimmed from each edge of the embossed sheet to produce a finished separator of the desired width. The supply roll 10 of fibrous sheet material P is preferably wound upon a supporting core, not shown, to rotate upon a shaft 11. The core has secured thereto a brake wheel 12 so that the unwinding of the paper sheet P from the package 10 will be retarded by a brake band 13 engaging this wheel, and one end of this band is anchored and the other end supports the weights 14. This sheet P is shown as passing from the supply package 10 downwardly into the tank 15 that contains the above described impregnating resin X mixed with a large amount of water. The paper P passes around the rollers 16 disposed below the level of the liquid X and as it leaves the tank 15 it passes upwardly between the squeeze rolls 17 which squeeze from the sheet the excess liquid. This sheet then passes through an opening 18 in the dryer housing 19 and it travels in this dryer in the direction indicated by the arrows about the guide rolls 20, and while the sheet passes between such rolls it is subjected to the drying action of the heating lamps 21. The fumes from the drying action within the dryer are carried off through the discharge pipe 22. The impregnated sheet P is preferably dried within the dryer 19 sufficiently to remove most but not all of its moisture and upon leaving this dryer it preferably retains from about 10 to 15% moisture, based upon the weight of the dry fibrous sheet plus resin. As this sheet leaves the dryer it passes through an opening 23 and is then wound upon the roll 24, which roll is driven by the gear 25. This 10 to 15% moisture causes a desired swelling of the paper sheet and renders it more flexible.

The impregnated sheet wound into the roll 24 may be transferred immediately to the apparatus shown in Fig. 1 and mounted in the position indicated by 24' at the left hand end of such apparatus. If however a substantial length of time, such as one or a number of days is to elapse before the impregnated sheet of the roll 24 is to be embossed, then this roll should be placed in a moisture tight envelope and in cold storage to prevent the sheet from drying out, and to prevent the resin therein from setting before the sheet is embossed.

Now referring more particularly to Fig. 1, it will be seen that the resin treated supply roll 24' is mounted at one end of the apparatus shown and is provided with the brake retarding means 26 which serves to place some tension upon the impregnated sheet, now designated by I, as it unwinds from the supply package 24'. This sheet I passes from the supply roll over a guide rod 27 and then in a horizontal direction in a straight line throughout practically the entire machine.

It is found desirable to heat the resin impregnated sheet I to a temperature of approximately 200° F. before it is subjected to the embossing operation, as this heat together with the small amount of moisture present in the sheet serves to increase the softness and flexibility of the sheet so that the embossing operation will be less likely to crack the paper sheet.

The embossing operation is preferably performed by advancing the sheet I at a uniform speed between embossing rolls, and it is found that if the embossing rolls are rotated at a slow speed the hot moist sheet I can be embossed without causing cracks to form along the embossed ribs. But it is important, in order to reduce manufacturing costs, to carry out the embossing operation at high speed, and it is found that if the sheet I is advanced rapidly between the embossing rolls cracks are likely to be produced along the embossed ribs, unless steps such as hereinafter described are taken to prevent the formation of such cracks.

The sheet I is shown as passing from the roll 27 horizontally between the electrically heated plates 28 and 29 that are supported in slightly spaced relation to each other by the machine frame 30. These pre-heating plates serve to heat the advancing sheet I to a temperature of about 200° F. before it reaches the embossing rolls 31 and 32 which are rotatably supported by the frame 33, and these rolls or one of the is driven by the motor 34. These rolls are not heated but some heat will be supplied to them by the hot sheet I.

If the pre-heated sheet I upon leaving the electric heaters 28 and 29 is embossed rapidly by the embossing rolls 31 and 32 it is likely to crack along the ribs. This is because the sheet is relatively inelastic and if subjected rapidly to a severe stretching operation by the distorting action of the male and female roll, it may crack at the ribs. We have found that such cracking can be prevented by covering each face of the fibrous sheet with a protecting apron or liner during the embossing operation. These aprons reinforce the paper sheet during the embossing operation and apparently permit some fibrous slippage in the sheet across the embossing surfaces to thereby lessen the strain on that portion of the fibrous sheet which is being displaced during the embossing operation.

One means for covering the fibrous sheet with protecting aprons during the embossing operation is shown in Fig. 1 of the drawing wherein the upper protecting apron or liner is indicated by 35 and the lower protecting apron is indicated by 36. These liners may be formed of metal foil or of a thin plastic film but are preferably formed of a laterally stretchable fabric. Such liners preferably are given the form of endless belts that pass between the embossing rolls with the traveling sheet I, and each liner or belt is made relatively long as shown to reduce the wear upon the same resulting from their repeated passage between the rolls 31 and 32, as these embossing rolls tend to wear the liners out rapidly. It is found that the life of such liners can be increased substantially by forming each apron of a thin woven stretchable fabric which is rendered somewhat elastic transversely by coating the surface of the same that contacts the sheet I with rubber to form a somewhat elastic rubber-backed stretchable fabric. The life of such liners may be further increased by applying talc to the face thereof that engages the resin-treated sheet I, to thereby prevent such resin as may be picked up from the sheet I from rendering the face of each liner tacky. When fabric liners are used they are compressed by the embossing pressure and this produces a distributed pressure on the sheet I at the embossing points, which is desired.

In the construction of Fig. 1 the upper endless liner 35 is shown as passing arouhnd the guide rolls 37, and the desired tension is maintained upon this liner by mounting one of these rolls 37 for sliding movement as indicated by 38 so that this roll is continuously urged in the belt tightening direction by a weight 39. The lower apron 36 passes around the guide rolls 40 and one of these rolls 40 is slidably mounted as indicated at 41 and is urged in the belt-tightening direction by the weight 42. Talc is applied to one face of the upper belt 35 by a rotating brush 43 which rotates in the talc box 44 and is driven by the chain 45. Talc is similarly applied to one face of the lower belt 36 by a brush 46 which rotates in the talc box 47, and this brush is driven by a chain 48 from the motor 49. The manner in which the aprons 35 and 36 protect or strengthen the sheet I during the embossing operation is shown in Fig. 3.

The action of the crimping rolls 31 and 32 is preferably such that they over-crimp the sheet I slightly, and then the height of the ribs R formed by the crimping operation is reduced to the desired dimension by passing the freshly crimped sheet between the accurately spaced rolls 50. It is found that this procedure of slightly over-crimping the sheet and then passing it between the accurately spaced rolls 50 gives good control of the height of the embossed ribs R.

The embossed sheet passes from the rolls 50 through a relatively long curing chamber where it is subjected to the heat of the electric heaters 51 and 52. The upper heater is preferably enclosed in the housing 53 and the lower heater in a housing 54, as best shown in Fig. 4. The upper housing is preferably pivotally secured to the lower housing by the hinges 55, so that the upper housing can be raised by the handle 56 when access to the interior of the curing oven is desired. These enclosed electric heaters preferably subject the advancing embossed sheet I to a temperature of 500° F. to 550° F., for a sufficient length of time to cure the resin with which the sheet is impregnated. This curing apparatus shown in Fig. 1 is supported by the uprights 57.

As the embossed and cured sheet I leaves the curing chamber it is preferably sprayed with a wetting agent as indicated at 58 and 59 as the introduction of this wetting agent into the pores of the sheet causes it to absorb the electrolyte quickly when the separator is first brought into contact with the same. The embossed separator then preferably has its sides trimmed by the rotating cutter discs 60 driven by the belt 61, to give this sheet I the width desired in the finished separator. The embossed sheet I is shown as drawn through the curing oven and past the rotating cutters 60 by the rolls 62 driven by a chain 63 from the motor 64. This completes the formation of the battery separators except for cutting the advancing sheet I transversely into the battery separators S. To effect this cutting operation the sheet I is advanced to a cutter by the reciprocating means 65, and the cutter comprising the fixed cutter block 66 and reciprocating cutter 67 cut the sheet I into the separators S. The cut separators are advanced by an endless belt 68 that is supported and driven by the rollers shown and the separators form a stack not shown. The finished separator S may have the appearance best shown in Figs. 10 and 11, in which it will be seen that the embossed separator has the raised hollow ribs R extending longitudinally thereof, and formed by displacing laterally the entire thickness of the rib-forming stock.

By employing the construction above described and using the aprons 35 and 36 to protect the fibrous sheet during the embossing operation it is found practical to carry out the embossing operation at high speed, say at the rate of 60 feet per minute without causing cracks to form along the ribs, but due to the wear upon the protecting aprons 35 and 36 caused by the severe pressure to which they are subjected by the embossing rolls, it is necessary to replace these aprons from time to time.

Figure 9:
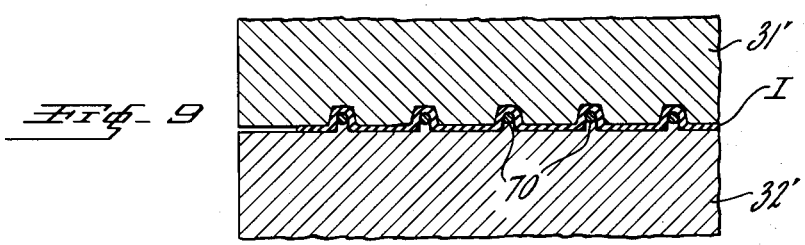
Fig. 9 is a similar view taken on the line 9—9 of Fig. 5.

It is found that highly satisfactory embossing results can be secured if the protecting aprons just mentioned are omitted, provided that an initial crimping or embossing operation is performed upon the fibrous sheet I before it is subjected to the embossing action of the embossing rolls. This initial embossing operation may be imparted to the sheet I by employing the modified construction shown in Figs. 5 and 6 of the drawing and which will now be described. The sheet I shown in Figs. 5 and 6 is preferably preheated similar to the manner above-described, by passing it between the heaters 28' and 29' so that when it leaves this pre-heater it passes under a guide roller 69 and then around an upper or female embossing roll 31'. It then passes between the nip of this upper roll 31' and a slightly ribbed lower roll 32'. These rolls are rotatably supported by the frame 33 and are driven by means, not shown. The advancing sheet I is pre-crimped while it engages the female roll 31'. This is accomplished by providing means for forcing the sheet I progressively into the grooves of the female roll 31'. To this end, a series of endless wires may be employed to force the sheet stock into the grooves of the roll 31', and these endless wires are arranged, as shown, to progressively press the sheet stock I into the recesses of the roll 31' in the order shown in the plan view of Fig. 7, where it will be seen that the central rib $r$ is formed first by drawing the sheet material inwardly in a lateral direction from its sides. Then the next pair of ribs $r'$ are initially formed, and then the pair of ribs $r''$ are initially formed. In this way the stock is drawn inwardly from the lateral sides as needed to form the embossed ribs, so that each rib is produced without appreciably stretching the sheet forming the same. These endless wires 70 pass around the guide roller 71 and are tensioned by adjusting the tension roll 72. The first wire 70 which forms the groove $r$ passes around a guide rod 73. The wires which form the grooves $r'$ pass around the rod 74, and the wires that form the grooves $r''$ pass around the rod 75, and so on until each groove or rib shown in Fig. 7 is produced in the sheet. It will be noted that all of the wires 70 curve around and are driven by the roll 31' and pass between the nip of the rolls 31' and 32' and then laterally and downwardly as indicated by the arrow. As a result of this construction the wires 70 press the paper into the grooves of the roll 31', and act as embossing ribs as shown in Fig. 9 of the drawing as these wires pass between the rolls.

Figure 10:
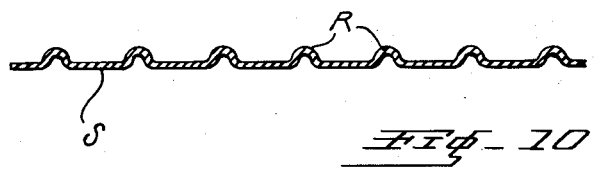
Fig. 10 is a transverse sectional view through a finished embossed separator such as can be produced by the apparatus shown on Sheet 1 of the drawing, or by the modified apparatus shown in Figs. 5 and 6 of the drawing.
Figure 11:
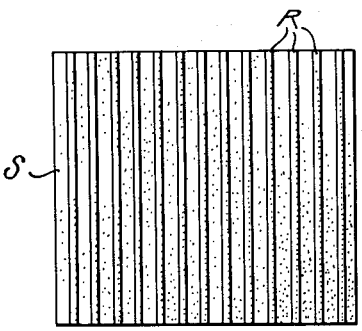
Fig. 11 is a face view of the embossed separator of Fig. 10.

It will be understood from the foregoing that the apparatus disclosed in Sheet 1 of the drawings may be employed to produce at high speed the separator shown in Figs. 10 and 11 of the drawing or if desired the modified construction shown in Sheet 2 of the drawings may be employed to produce a rather similar embossed sheet at high speed. The advantage of employing the construction of Sheet 2 is that the sheet stock is stretched less during the rib formation if the pre-crimping equipment of this sheet is employed. Also the cost of providing and replacing liners is avoided by using the construction of Sheet 2.

Battery separators formed in accordance with the present method are relatively inexpensive to produce, as the cellulose fibrous sheet used is not expensive and the amount of resin used to stiffen the sheet and protect the fibers is small. These separators have low electrical resistance and are found in practice to give satisfactory and long service in batteries of the type used in automobiles.

Having thus described our invention, what we claim and desire to protect by Letters Patent is:

1. The method of making porous embossed battery separators through which an electrolyte can pass which comprises, providing a bibulous cellulose fibrous sheet, impregnating this sheet with a resinous bonding agent so as to deposit the same in and around the fibers, drying the impregnated sheet sufficiently to remove most of its moisture and while it contains a small amount of moisture embossing the sheet so as to form laterally-spaced raised hollow ribs by advancing it between rotating embossing rolls that somewhat over emboss the sheet, then passing the sheet between accurately spaced smooth rolls that press the ribs down to a predetermined height, then heating this embossed sheet to cure the resin, and cutting the sheet into battery separators.

2. The method of making porous embossed battery separators through which an electrolyte can pass which comprises, providing a bibulous cellulose fibrous sheet, impregnating this sheet with an aqueous solution of an A-stage phenol-formaldehyde resin so as to deposit the resin in and around the fibers, drying the impregnated sheet to a volatile content of from 10 to 15% by weight based upon the weight of the basic fiber sheet plus resin, then covering each face of such sheet with a protecting apron of laterally stretchable sheet material that is sufficiently stretchable so that the sheet and protecting aprons will stretch laterally together in the area of each rib, embossing the sheet with laterally spaced hollow ribs by advancing the apron-sheet sandwich rapidly and continuously between rotating embossing rolls to emboss the sheet with ribs spaced laterally of the sheet and extending along the length of the sheet, removing the aprons, then immediately passing the embossed sheet through a highly heated passage continuously to heat the embossed sheet to cure the resins so that the sheet remains porous to an electrolyte, and cutting the sheet into battery separators.

3. The method of making porous embossed battery separators through which an electrolyte can pass which comprises, providing a bibulous cellulose fibrous sheet of great length, advancing this sheet through a bath of thermosetting resinous bonding agent dissolved in an aqueous medium continuously to impregnate the sheet so as to deposit the resin in and around the fibers, drying the impregnated sheet sufficiently to remove most of its moisture, and while it contains a small amount of moisture embossing the sheet with laterally spaced hollow ribs by advancing it continuously and rapidly between rotating embossing rolls to emboss ribs which are spaced laterally of the sheet and extend along the length of the sheet, and covering each face of the advancing sheet while it is being embossed with a laterally stretchable apron composed of a material that is sufficiently stretchable so that the sheet and protecting aprons will stretch laterally together in the area of each rib, then advancing immediately the sheet rapidly and continuously between spaced heating platens to cure the sheet so that it remains pervious to an electrolyte, and cutting the sheet into battery separators.

4. The method of making porous embossed battery separators through which an electrolyte can pass which comprises, providing a bibulous cellulose fibrous sheet, impregnating this sheet with a resinous bonding agent so as to deposit the same in and around the fibers, drying the impregnated sheet sufficiently to remove most of its moisture and while it contains a small amount of moisture embossing the sheet so as to form laterally spaced raised hollow ribs by advancing it between rotating embossing rolls and providing at each face of the sheet a laterally stretchable protecting apron composed of a material that is sufficiently stretchable so that the sheet and protecting aprons will stretch laterally together in the area of each rib, then immediately heating this embossed sheet to cure the resin, and cutting the sheet into battery separators.

5. The method of making porous embossed battery separators through which an electrolyte can pass which comprises, providing a bibulous cellulose fibrous sheet, impregnating this sheet with a resinous bonding agent so as to deposit the same in and around the fibers, drying the impregnated sheet to a volatile content of from 10 to 15% by weight based upon the weight of the basic fiber sheet plus resin, embossing the sheet so as to form laterally spaced raised hollow ribs by advancing it between rotating embossing rolls and providing at each face of the sheet a laterally stretchable protecting apron composed of a material that is sufficiently stretchable so that the sheet and protecting aprons will stretch laterally together in the area of each rib, then immediately heating this embossed sheet to cure the resin, and cutting the sheet into battery separators.

6. The method of making porous embossed battery separators through which an electrolyte can pass which comprises, providing a bibulous cellulose fibrous sheet, impregnating this sheet with a resinous bonding agent so as to deposit the same in and around the fibers, drying the impregnated sheet sufficiently to remove most of its moisture and while it contains a small amount of moisture embossing the sheet with laterally spaced hollow ribs by advancing it rapidly between rotating embossing rolls and providing at each face of the sheet a laterally stretchable protecting apron composed of a material that is sufficiently stretchable so that the sheet and protecting apron will stretch laterally together in the area of each rib, then advancing the embossed sheet through a highly heated passage to cure the resin so that the sheet remains pervious to an electrolyte, and cutting the sheet into battery separators.

7. The method of making porous embossed battery separators through which an electrolyte can pass which comprises, providing a bibulous cellulose fibrous sheet, impregnating this sheet with an aqueous solution of an A-stage phenol formaldehyde resin so as to deposit the resin in and around the fibers, drying the impregnated sheet sufficiently to remove most of its moisture and while it contains a small amount of moisture embossing the sheet so as to form laterally spaced raised hollow ribs by advancing it between rotating embossing rolls and providing at each face of the sheet a laterally stretchable protecting apron composed of a material that is sufficiently stretchable so that the sheet and protecting aprons will stretch laterally together in the area of each rib, removing the aprons and then heating the embossed sheet to cure the resin so that the sheet remains porous to an electrolyte, and cutting the sheet into battery separaors.

8. The method of making porous embossed battery separators through which an electrolyte can pass which comprises, providing a bibulous cellulose fibrous sheet, impregnating this sheet with a thermostetting resinous bonding agent dissolved in an aqueous medium so as to deposit the resin in and around the fibers, drying the impregnated sheet sufficiently to remove most of its moisture and while it contains a small amount of moisture embossing the sheet with laterally spaced hollow ribs by advancing it rapidly between rotating embossing rolls and providing at each face of the sheet while it is being embossed a laterally stretchable protecting apron having talc on the sheet engaging face and composed of a material that is sufficiently stretchable so that the sheet and protecting apron will stretch laterally together in the area of each rib, then curing the sheet so that it remains pervious to an electrolyte, and cutting the sheet into battery separators.

References Cited in the file of this patent

UNITED STATES PATENTS

| Number | Name | Date |
|---|---|---|
| 785,786 | Wolff | Mar. 28, 1905 |
| 942,852 | Backeland | Dec. 7, 1909 |
| 1,206,983 | Bliss | Dec. 5, 1916 |
| 1,587,462 | Adams | June 1, 1926 |
| 1,785,391 | Russell | Dec. 16, 1930 |
| 2,030,066 | Jewett | Feb. 11, 1936 |
| 2,224,992 | Sutherland | Dec. 17, 1940 |
| 2,414,177 | Smith | Jan. 14, 1947 |
| 2,591,755 | Wilson et al. | Apr. 8, 1952 |
| 2,626,429 | Merrill | Jan. 27, 1953 |

OTHER REFERENCES

Serial No. 185,492, Franke (A. P. C.), published April 27, 1943.